United States Patent
Lee et al.

(10) Patent No.: US 9,514,742 B2
(45) Date of Patent: Dec. 6, 2016

(54) SYSTEM AND METHOD FOR MANAGING CONVERSATION

(71) Applicant: POSTECH ACADEMY-INDUSTRY FOUNDATION, Pohang-si (KR)

(72) Inventors: Gary Geunbae Lee, Pohang-si (KR); Hyungjong Noh, Incheon (KR); Kyusong Lee, Seoul (KR)

(73) Assignee: POSTECH ACADEMY-INDUSTRY FOUNDATION, Pohang-Si (KR)

( * ) Notice: Subject to any disclaimer, the term of this patent is extended or adjusted under 35 U.S.C. 154(b) by 0 days.

(21) Appl. No.: 14/386,927
(22) PCT Filed: Jan. 18, 2013
(86) PCT No.: PCT/KR2013/000408
§ 371 (c)(1),
(2) Date: Sep. 22, 2014
(87) PCT Pub. No.: WO2013/172534
PCT Pub. Date: Nov. 21, 2013

(65) Prior Publication Data
US 2015/0058014 A1    Feb. 26, 2015

(30) Foreign Application Priority Data

May 17, 2012 (KR) .......... 10-2012-0052647

(51) Int. Cl.
G10L 15/04 (2013.01)
G10L 15/06 (2013.01)
(Continued)

(52) U.S. Cl.
CPC ............ G10L 15/063 (2013.01); G06F 17/277 (2013.01); G06F 17/278 (2013.01); G06F 17/279 (2013.01);
(Continued)

(58) Field of Classification Search
CPC .... G10L 15/142; G10L 15/18; G10L 15/1815; G10L 15/183; G10L 15/22; G10L 15/24; G10L 15/285; G10L 15/30; G10L 25/69; G06F 17/27; G06F 17/2715; G06F 17/2775; G06F 17/2785; G06F 17/2809; G06F 17/3043; G06F 17/30654; G06F 17/30684; G06F 17/2735; G06F 17/277; G06F 17/2818
(Continued)

(56) References Cited

U.S. PATENT DOCUMENTS 6,430,551 B1    8/2002  Thelen et al.
8,457,959 B2 *  6/2013  Kaiser ................... G10L 15/24
                                                                704/231
(Continued)

FOREIGN PATENT DOCUMENTS

KR       10-0487716       5/2005
KR    10-2006-0043845     5/2006

*Primary Examiner* — Vijay B Chawan
(74) *Attorney, Agent, or Firm* — Lex IP Meister, PLLC

(57) ABSTRACT

A conversation management system includes: a training unit that generates an articulation speech act and an entity name of a training corpus, that generates a lexical syntactic pattern, and that estimates a speech act and an entity name of a training corpus; a database that stores the articulation speech act, the entity name, and the lexical syntactic pattern of the training corpus; an execution unit that generates an articulation speech act and an entity name of a user, that generates a user lexical syntactic pattern, that estimates a speech act and an entity name of a user, that searches for an articulation pair corresponding to a user articulation at the database using a search condition including the estimated user speech act and the generated user lexical syntactic pattern, and that generates a final response by selecting an articulation template using a restriction condition including an estimated entity name among the found articulation pair; and an output unit that outputs a final response that is generated by the execution unit.

18 Claims, 4 Drawing Sheets

(51) Int. Cl.
  *G09B 19/06* (2006.01)
  *G06F 17/27* (2006.01)
(52) U.S. Cl.
  CPC ....... *G09B 19/06* (2013.01); *G10L 2015/0633* (2013.01)
(58) Field of Classification Search
  USPC .......... 704/270, 2, 231, 236, 243, 254, 257; 707/999.004
  See application file for complete search history.

(56) References Cited

U.S. PATENT DOCUMENTS

| | | | | |
|---|---|---|---|---|
| 2004/0030556 | A1* | 2/2004 | Bennett | G06F 17/27 704/270 |
| 2008/0221893 | A1* | 9/2008 | Kaiser | G10L 15/24 704/257 |
| 2009/0157401 | A1* | 6/2009 | Bennett | G06F 17/27 704/243 |
| 2010/0208626 | A1* | 8/2010 | Hamasaki | H04M 9/08 370/260 |
| 2010/0299132 | A1* | 11/2010 | Dolan | G06F 17/2818 704/2 |
| 2012/0078631 | A1* | 3/2012 | Sun | G06F 17/277 704/254 |

* cited by examiner

SYSTEM AND METHOD FOR MANAGING CONVERSATION

TECHNICAL FIELD

The present invention relates to a conversation management system and conversation management method for a chat conversation.

BACKGROUND ART

In general, a conversation system may be classified into an object directional system for achieving a specific object/service and a chat system for an everyday conversation. Nowadays, with the spread of mobile devices, a user can easily access a conversation management system for fun. Such a chat system becomes a meaningful system to a person having a short rest time, elderly people to which someone to talk to is necessary, and children accessing for a simple interest. A merit of a chat system may be that a user is more familiar with accessing a mobile device by housing a chat system in the mobile device. General technology of an existing conversation management system is as follows. In order to construct a system, a (user articulation)-(system articulation) pair is previously constructed, and in order to increase coverage, a developer directly manually writes a lexical pattern of each user articulation. Thereafter, upon actually executing a conversation, in order to output an appropriate response to a sentence that a user articulates, the conversation management system compares the user articulation one to one with previously constructed lexical patterns, searches for a most appropriate pattern, and sends a system articulation that is connected to the pattern as a response.

DISCLOSURE

Technical Problem

The conventional art of a method and system for managing a conversation based on a part of speech and an entity name priority within an articulation for a chat conversation may include Korean Patent Application No. 10-2006-0034187. Korean Patent Application No. 10-2006-0034187 suggests a method of managing a conversation using a conversation modeling technique through construction of a conversation example database. However, because the system basically uses a method of managing a conversation based on an object directional conversation, the system has a limitation in processing articulation of various subjects. As another conventional art, Korean Patent Application No. 10-2011-0016755 suggests a method of managing a conversation for language education. However, the method has a limitation that it should manually perform an intention display of a user articulation, and thus a chat system that an articulation of an unlimited subject may actually enter cannot be completely implemented with methodology of the patent.

The above information disclosed in this Background section is only for enhancement of understanding of the background of the invention and therefore it may contain information that does not form the prior art that is already known in this country to a person of ordinary skill in the art.

Technical Solution

An exemplary embodiment of the present invention provides a conversation management system including: a training unit that generates an articulation speech act and an entity name of a training corpus, that generates a lexical syntactic pattern, and that estimates a speech act and an entity name of a training corpus; a database that stores the articulation speech act, the entity name, and the lexical syntactic pattern of the training corpus; an execution unit that generates an articulation speech act and an entity name of a user, that generates a user lexical syntactic pattern, that estimates a speech act and an entity name of a user, that searches for an articulation pair corresponding to a user articulation at the database using a search condition including the estimated user speech act and the generated user lexical syntactic pattern, and that selects an articulation template using a restriction condition including an estimated entity name among the found articulation pair; and an output unit that outputs a final response from the articulation template that is selected by the execution unit.

Another embodiment of the present invention provides a method of managing a conversation including: a training step of generating an articulation speech act and an entity name of a training corpus, generating a lexical syntactic pattern, and estimating a speech act and an entity name of a training corpus; storing the articulation speech act, the entity name, and the lexical syntactic pattern of the training corpus at a database; an execution step of generating an articulation speech act and an entity name of a user, generating a user lexical syntactic pattern, estimating a speech act and an entity name of a user, searching for an articulation pair corresponding to a user articulation at the database using a search condition including the estimated user speech act and the generated user lexical syntactic pattern, and selecting an articulation template using a restriction condition including an estimated entity name among the found articulation pairs; and outputting a final response from the articulation template that is selected by the execution unit.

A conversation management system of the present invention uses a new articulation search method using a part of speech priority and automatically analyzing a morpheme using a machine learning algorithm instead of using similarity of a sentence surface or rule-based surface comparison conventionally using in a conventionally developed conversation management system. Therefore, a tagging cost is considerably reduced, compared with an existing surface rule writing method requiring much effort by a person. This is a large merit in view of commercialization and maintenance of an actual system, and a system independent of a language can be constructed.

Further, a response that is irrelevant to a present conversation subject can be previously prevented and a conversation relevant to a present subject can be made through a method of selecting and generating an articulation using a correlation between an entity name and an articulation/context that is suggested in the present invention. In this way, a response of a system appropriately using an entity name that has appeared in a conversation performs a large function in giving a feeling of having an actual conversation to a user.

Therefore, a conversation management system of the present invention can satisfy both an experience performance and practicality in constructing a chat system.

Advantageous Effects

The present invention has been made in an effort to provide a conversation management system and conversation management method having advantages of effectively managing a conversation and implementing an articulation automatic analysis and expression system using part of speech information instead of manual writing of a lexical pattern rule for analyzing an articulation.

The present invention further provides a conversation management system and conversation management method having advantages of generating an appropriate response to a user articulation further than an existing conversation management system by suggesting a new policy in consideration of a relationship between an entity name, an articulation, and a context, and by generating a response according to a persona of a system.

The object of the present invention is not limited to the above-described objects, and the other objects will be understood by those skilled in the art from the following description.

MODE FOR INVENTION

Figure 1:
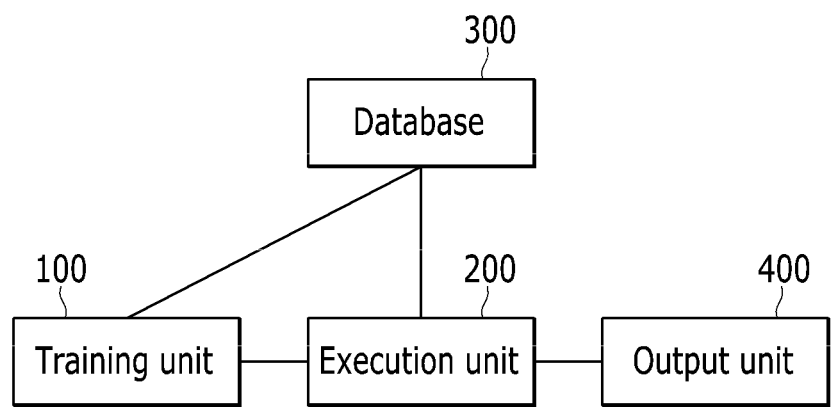
FIG. 1 is a block diagram illustrating a configuration of a conversation management system according to an exemplary embodiment of the present invention.

Hereinafter, exemplary embodiments of the present invention will be described in detail with reference to the attached drawings, like reference numerals designate like elements throughout the specification, and the drawings and description are to be regarded as illustrative in nature and not restrictive. In general, a suffix such as "module" and "unit" is merely intended to facilitate description of the specification, and the suffix itself is not intended to give any special meaning or function. Further, detailed descriptions of well-known functions and structures incorporated herein may be omitted to avoid obscuring the subject matter of the present invention. The accompanying drawings are used to help easily understand various technical features, and it should be understood that the embodiments presented herein are not limited by the accompanying drawings. While the present invention may be embodied in many different forms, specific embodiments of the present invention are shown in drawings and are described herein in detail, with the understanding that the present invention is to be considered as an exemplification of the principles of the invention and is not intended to limit the invention to the specific embodiments illustrated.

A term "a first" and "a second" may be used for describing various elements, but the elements are not limited by the terms. The terms are used for distinguishing one element from another element.

When it is described that an element is "coupled" to another element, the element may be "directly coupled" to the other element or "electrically coupled" to the other element through a third element. However, when it is described that an element is "directly coupled" to another element, no element may exist between the element and the other element.

When using in a description of the present invention and the appended claims, a singular form includes a multiple form unless explicitly described to the contrary.

Further, in the present specification, a term "comprise" or "have" indicates presence of a characteristic, numeral, step, operation, element, component, or combination thereof described in the specification, and does not exclude the presence or addition of at least one other characteristic, numeral, step, operation, element, component, or combination thereof.

Hereinafter, exemplary embodiments of the present invention will be described in detail with reference to the attached drawings such that the present invention can be easily put into practice by those skilled in the art. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In addition, in an entire specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, a system and method for managing a conversation according to an exemplary embodiment of the present invention will be described in detail with reference to the drawings.

FIG. 1 is a block diagram illustrating a configuration of a conversation management system according to an exemplary embodiment of the present invention. The conversation management system according to the present exemplary embodiment includes a training unit 100, an execution unit 200, a database 300, and an output unit 400.

The training unit 100 includes a classifier for estimating a speech act and an entity name in an articulation of a training corpus and generates a machine learning model that estimates a speech act and an entity name in an input training corpus using the classifier. The training unit 100 analyzes a part of speech of an articulation of a training corpus and defines a priority of tag sets substantially representing the part of speech. The training unit 100 generates a lexical syntactic pattern of a user articulation based on the analyzed part of speech information and the tag set. In order to perform conversation management based on a part of speech and an entity name priority within an articulation for a chat conversation, the training unit 100 displays entity name information in a training corpus and displays an entity name and information between an articulation/context based on the displayed entity name information. The training unit 100 extracts a relationship between an articulation/context and an entity name that is tagged to a training corpus articulation. The training unit 100 collects generated information, such as the generated lexical syntactic pattern (LSP), the extracted entity name information, and a speech act related to an articulation pair of a training corpus and stores the information at the database 300.

The execution unit 200 estimates a speech act and an entity name of a user articulation that is input when an actual conversation is performed using a machine learning model that is generated in the training unit 100. The execution unit 200 analyzes a part of speech of the user articulation and generates a user LSP of the user articulation. The execution unit 200 searches for an example articulation pair appropriate to a present user articulation using the speech act, the user LSP, and entity name information. When an articulation pair corresponding to a user articulation are found, the execution unit 200 selects an articulation template in consideration of a present system persona and generates a final response articulation.

The database 300 stores information that is generated in the training unit 100, such as an LSP that is generated in the training unit 100, extracted entity name information, and a speech act related to an articulation pair of a training corpus.

The output unit 400 outputs a final response articulation that is generated by the execution unit 200.

Figure 2:
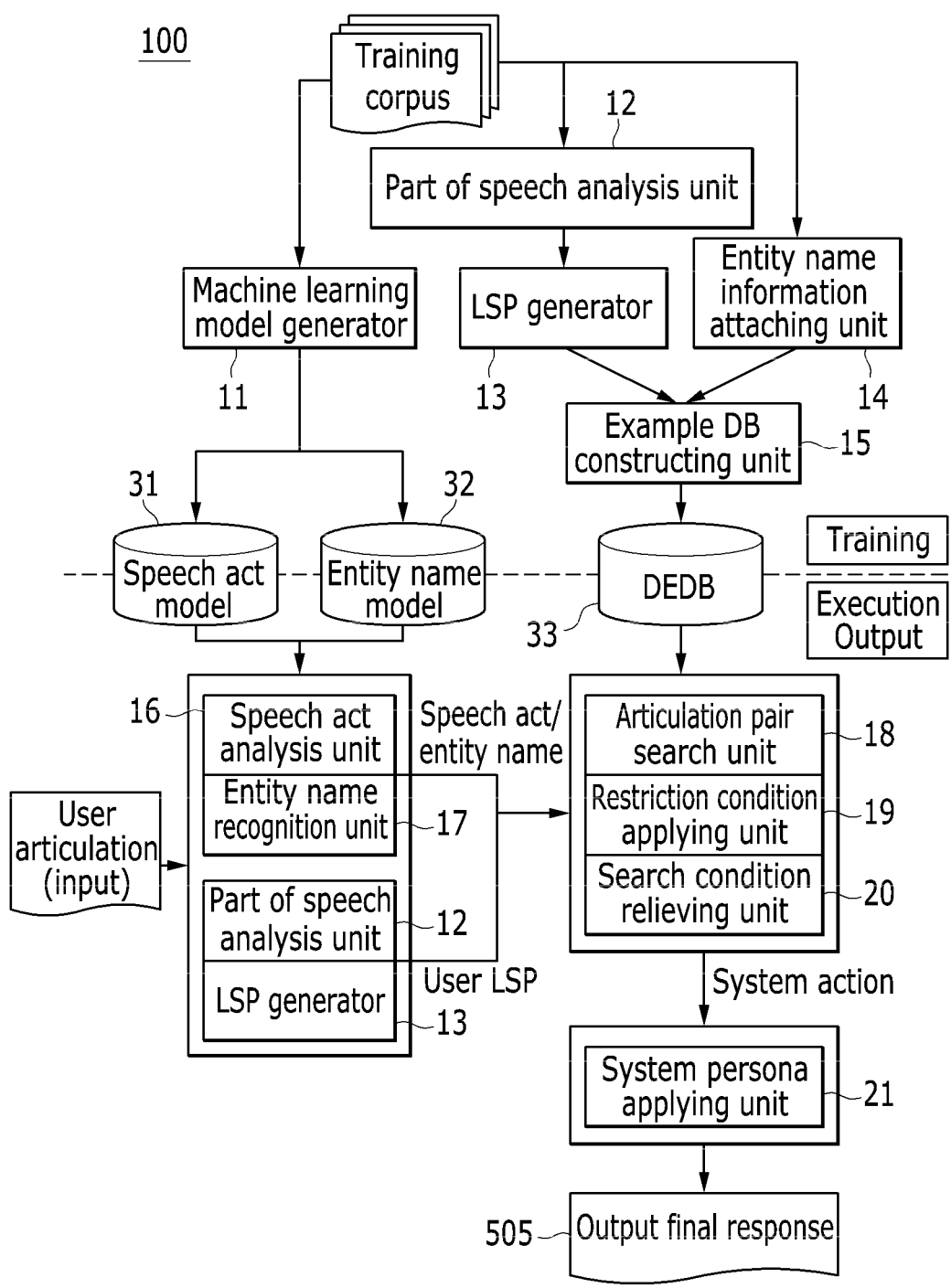
FIG. 2 is a flowchart illustrating operation in a conversation management system according to an exemplary embodiment of the present invention.

FIG. 2 is a flowchart illustrating operation in a conversation management system according to an exemplary embodiment of the present invention.

The training unit 100 of the conversation management system according to the present exemplary embodiment includes a machine learning model generator 11, a part of speech analysis unit 12, an LSP generator 13, an entity name information attaching unit 14, and an example DB constructing unit 15.

The machine learning model generator 11 receives an input of a training corpus and generates a speech act model 31 and an entity name model 32, which are parts of a machine learning model that estimates a speech act and an entity name.

The part of speech analysis unit 12 analyzes morphemes of articulations in a training corpus, and stores each morpheme and part of speech information thereof.

The LSP generator 13 generates an LSP of a training corpus articulation using part of speech information that is stored at the part of speech analysis unit 12.

The entity name information attaching unit 14 extracts a relationship between an articulation/context and an entity name that is tagged to a training corpus articulation.

The example DB constructing unit 15 collects information such as an LSP that is generated in the LSP generator 13, entity name information that is extracted from the entity name information attaching unit 14, and a speech act related to an articulation pair, indexes the information, generates a dialog example database (DEDB) 33 using information such as a speech act related to an articulation pair, and transmits the DEDB 33 to the database 300.

The database 300 stores the DEDB 33 that is transmitted from the example DB constructing unit 15.

The execution unit 200 of the conversation management system according to the present exemplary embodiment includes a part of speech analysis unit 12, an LSP generator 13, an entity name information attaching unit 14, an example DB constructing unit 15, a speech act analysis unit 16, an entity name recognition unit 17, an articulation pair search unit 18, a restriction condition applying unit 19, a search condition relieving unit 20, and a system persona applying unit 21.

The speech act analysis unit 16 and the entity name recognition unit 17 estimate a speech act and an entity name of a user articulation using the generated speech act model 31 and entity name model 32, respectively.

The part of speech analysis unit 12 analyzes morphemes of articulations in a user articulation and stores each morpheme and part of speech information thereof.

The LSP generator 13 generates an LSP of a user articulation using part of speech information of a user articulation that is stored at the part of speech analysis unit 12.

The articulation pair search unit 18 and the restriction condition applying unit 19 search for an example articulation pair appropriate to a present user articulation using the information. If an appropriate example is not found, in order to search for an example most similar to a present condition, the search condition relieving unit 20 relieves a restriction condition, and the articulation pair search unit 18 and the restriction condition applying unit 19 repeat a search. In this process, if an appropriate example is found, the system persona applying unit 21 receives a corresponding system action and selects an articulation template in consideration of a present system persona.

The output unit 400 generates an articulation sentence to be output by a system according to a correlation of an articulation and entity names existing at the template, and finally outputs a system response.

Figure 3:
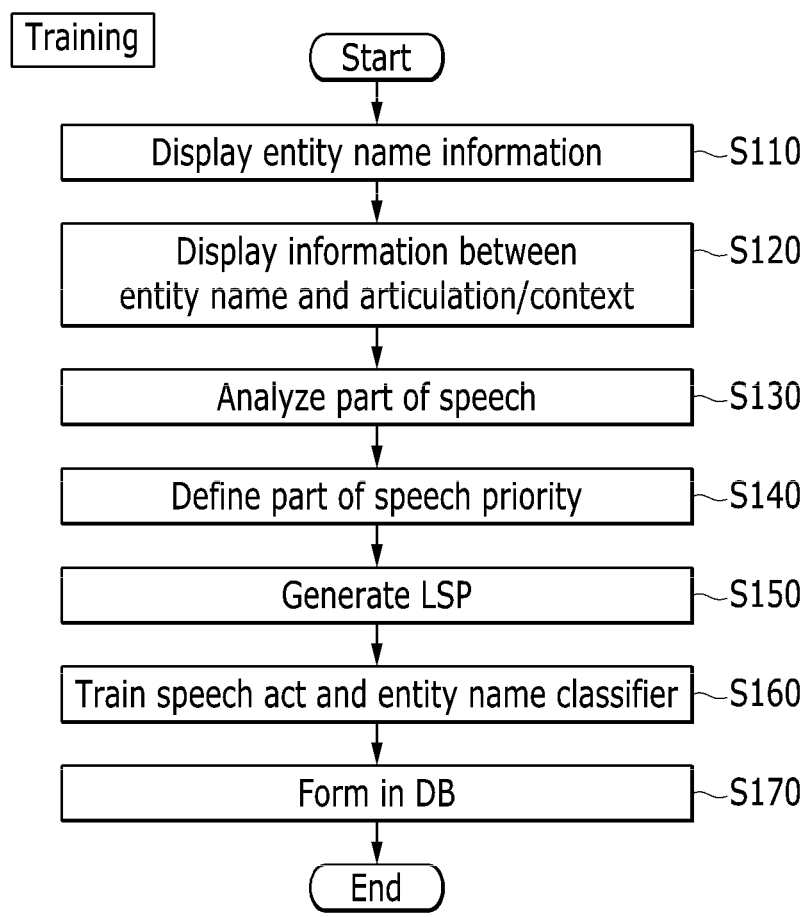
FIG. 3 is a flowchart illustrating operation in a training unit of a conversation management system according to an exemplary embodiment of the present invention.

FIG. 3 is a flowchart illustrating operation of performing in the training unit 100 of a conversation management system according to an exemplary embodiment of the present invention. Hereinafter, operation in the training unit 100 of the conversation management system according to an exemplary embodiment of the present invention will be described using FIG. 3.

In order to manage a conversation based on a part of a speech and an entity name priority within an articulation for a chat conversation, as shown in FIG. 3, entity name information should be attached to a training corpus (step 110). Entity name information attachment involves separately writing a meaningful word in a conversation context within an articulation. For example, in an articulation of "What are the most favorite sports of teens?", a word that should be considered for an appropriate response is "teens" that becomes a subject of a liking act and "sports" that become an object thereof, and the words are previously represented upon training. Further, an appropriate type is defined and attached to each entity name. In the above example, "teens" may have a type of a generation, and "sports" may have a type of a sports_type. Accordingly, in an example articulation, an entity name may be represented within an articulation, as in "What are the most favorite /sports/sports_type/ of /teens/generation/?".

Information between an entity name and an articulation/context is attached based on the entity name information that is defined and attached at step 110 in this way (step 120). Attachment of information between an entity name and an articulation involves displaying whether a corresponding entity name can be replaced with another entity name within the same type within a random articulation. If replacement with another entity name is unavailable, a separate symbol "$" is attached, and the attached symbol "$" represents that the entity name and the articulation are closely related. For example, when an articulation of "/kimchi/food/ is the best food to a Korean." is given, if an entity name is replaced with "hamburger" of another food type instead of kimchi, the meaning of the articulation may be awkward. In consideration of a meaning of "Korean" within the articulation, an entity name of "kimchi" is closely related to the articulation and thus cannot be freely replaced with an entity name of other food types such as "spaghetti" and "hamburger". Therefore, in this case, the symbol "$" is attached, as in "/kimchi/$food/ is the best food to a Korean.", and the attached symbol "$" represents that a corresponding entity name is related to the articulation. The information is used when executing a later conversation management step. Attachment of information between an entity name and a context represents whether a corresponding entity name is necessary in the foregoing context in consideration of an entire conversation rather than a correlation within a corresponding articulation.

The following example is considered.

Example 1

User: Who was /the 1960s/year/ most famous /singer/entity_type/?
System: /Mija Lee/$singer/ was the queen of elegy.

In this example, in order to represent a system articulation, an entity name of "the 1960s" and "singer" should be clearly represented. Otherwise, it may be unnatural to represent an answer of "Mija Lee". For example, "/Mija Lee/$singer/ was the queen of elegy." cannot be a response to a question such as "Who was /the 2000s/year/most famous /singer/entity_type/?", or "Who was /the 1960s/year/ most famous /actor/entity_type/?". In this way, when the foregoing entity name is always represented, context information is represented. For this reason, a corresponding entity name should be displayed in a context in a "[/$value/$type/]" form beside an articulation. The above example may be represented according to this policy as follows.

User: Who was /the 1960s/year/ most famous /singer/entity_type/?
System: /Mija Lee/$singer/ was the queen of elegy. [/the 1960s/$year/][/singer/$entity_type/]

Further, there may be a case that should represent a relationship between a type of an entity name and a context.

Example 2

User: The saddest day of the year is the day that/the baseball/sports/ season is over.
System: The happiest day of the year is the day that /the baseball/sports/ season starts?

In this example, when considering a meaning of a system articulation (word of a season, etc.), an entity name of a previous sports type should preferentially appear. However, unlike the foregoing Example 1, even if the entity name is "soccer" or "basketball" instead of "baseball", there is no particular problem. That is, in Example 2, a type of sports should be represented instead of a specific entity name of "baseball" in a previous context. In this way, when the foregoing specific type is always represented, context information is represented in an "[/ANY/type/]" form. The above example may be represented according to this policy as follows.

User: The saddest day of the year is the day that /the baseball/sports/ season is over.
System: The happiest day of the year is the day that /the baseball/sports/ season starts? [/ANY/sports/] In this way, a relationship between an attached entity name and articulation/context is used for searching for an articulation pair when executing a conversation later.

Thereafter, a part of speech of an articulation is analyzed (step 130).

The part of speech divides a word according to a grammatical function, a form, or a meaning, and has a classification such as a noun, a verb, and an adjective. In order to analyze a part of speech, an analysis result is output using an existing developed morpheme analyzer. For example, an articulation of "How many seconds does it take to run 100 meters?" is analyzed as "100/SN meter/NNG how many/MM second/NNB run/VV".

Thereafter, a priority of tag sets substantially representing a part of speech is defined (step 140). Thereafter, in order to represent an LSP of the articulation, part of speech information is used, and importance is different according to the part of speech. For example, "NN" representing a noun or "VV" representing a verb rather than "EC" representing an ending generally appearing at the end of a sentence have a more important meaning. Therefore, a priority is sequentially defined in an entire tag of a tag set.

An LSP of the articulation is generated based on important tag sets and part of speech information that is analyzed at steps 130 and 140 (step 150). In a part of speech analysis result, only major parts of speech having importance of a predetermined level or more are selected, and the major parts of speech are combined to generate an LSP. Parts of speech are connected using "." as a separator. The LSP that is generated in this way is used for searching for an articulation later pair in a conversation management policy. In the above example sentence, "NNG", "MM", "NNB", and "VV" are selected as major parts of speech, and "meter/NNG.how many/MM.second/NNB.run/VV." is finally generated as an LSP.

Thereafter, in an articulation, a classifier for estimating a speech act and an entity name is trained (step 160). A speech act is an intention of a general speaker independent of a conversation subject. Therefore, a speech act is a closed set, and a speech act of a random articulation can be estimated through a classifier that is generated according to a machine learning algorithm. Because a type of the entity name is also previously defined, a speech act can be estimated using a classifier. A methodology that can use with such a classifier includes conditional random fields (CRF) and a support vector machine (SVM), and an entire existing algorithm that is independent of a specific methodology and that can be used for a classifier can be applied to the methodology.

Thereafter, speech act, LSP, and entity name information that are represented at the above steps are indexed and formed in a DB (step 170).

A basic (user articulation)-(system articulation) pair and speech act, LSP, and entity name information related to each articulation are collected and formed in a DB. The DB that is generated here becomes a substantial target of a search when searching for an articulation pair later at the conversation management step.

Figure 4:
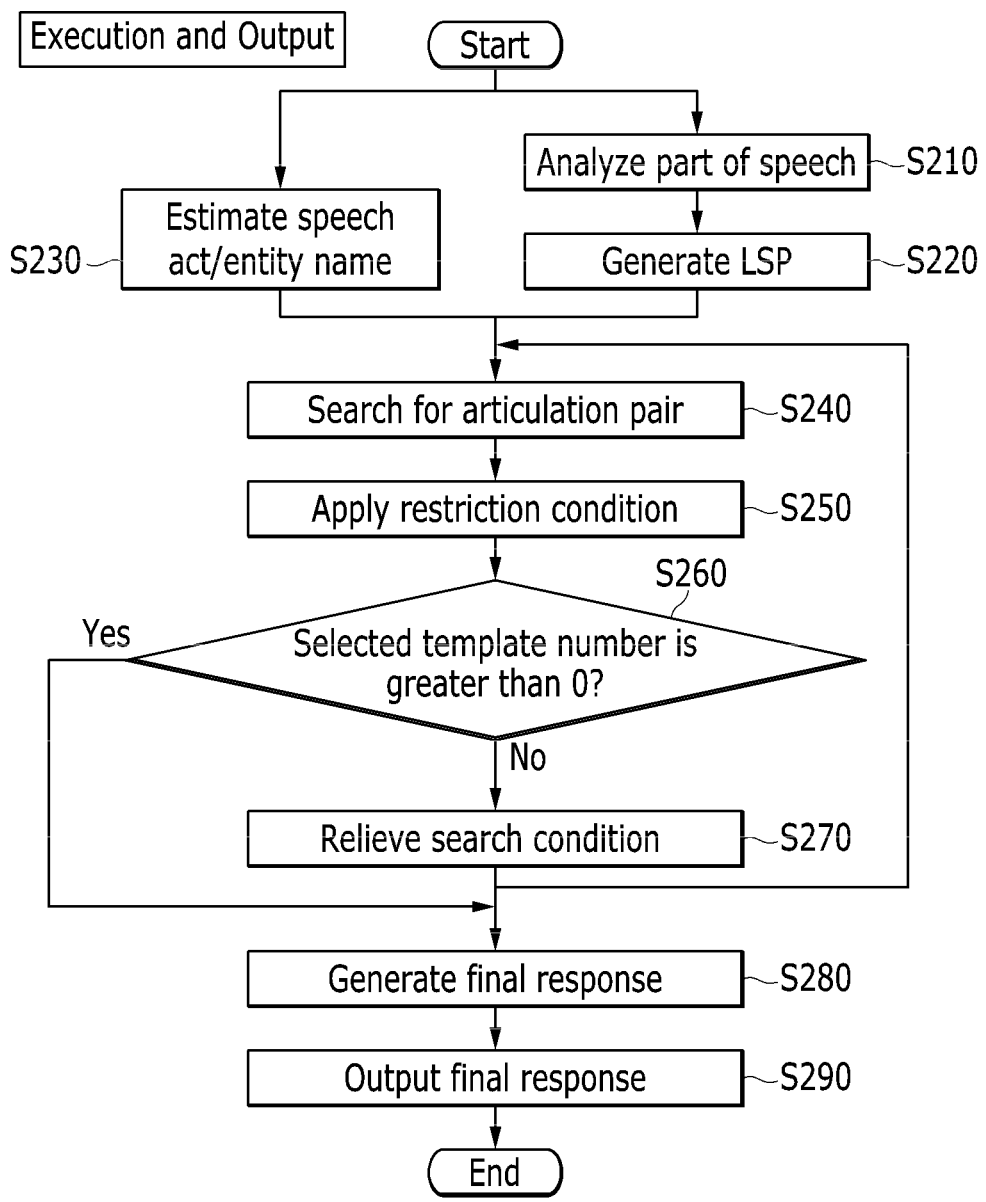
FIG. 4 is a flowchart illustrating operation in an execution unit of a conversation management system according to an exemplary embodiment of the present invention.

FIG. 4 is a flowchart illustrating operation in an execution unit 200 of a conversation management system according to an exemplary embodiment of the present invention. Hereinafter, operation in the execution unit 200 and the output unit 400 of a conversation management system according to an exemplary embodiment of the present invention will be described using FIG. 4.

In order to perform conversation management based on a part of speech and an entity name priority within an articulation for a chat conversation, as shown in FIG. 4, when managing a chat conversation, a part of speech of an articulation that is transferred from a user is analyzed, and a user LSP is generated based on the analyzed part of speech (steps 210 and 220). A process of this step is completely the same as steps 130 and 150 described above and thus a detailed description thereof will be omitted.

Thereafter, a speech act/entity name is estimated from a present user articulation (step 230). An entity name and a speech act of a present user articulation are estimated using a classifier that is generated at the training step 160.

An appropriate articulation pair are searched for with a present user articulation and a response thereto using a search condition including a speech act and user LSP information that is estimated at steps 210, 220, and 230 (step 240). A search target at step 240 is a DB that is generated at the training step 170. A method of applying a restriction condition of each of a speech act and an LSP is as follows. In speech act application, only an articulation pair accurately corresponding with the speech act that is estimated at step 230 are searched for. In LSP application, an articulation pair are searched for in an AND condition in a logic operation using, as a unit, respective morphemes (respective parts of speech) in a user LSP that is generated at step 220. For example, when a generated user LSP is "meter/NNG.how many/MM.second/NNB.run/VV", a search is performed for an articulation pair entirely including a total of four morphemes of meter/NNG, how many/MM, second/NNB, and run/VV in an LSP of an example articulation pair as a search condition.

Thereafter, an appropriate articulation pair are searched for with a present user articulation and a response thereto using a restriction condition including entity name information that is generated at step 230 (step 250). Examples corresponding to an entity name condition among example articulation pairs that are found at step 240 are again selected. A restriction condition is applied as follows.

When entity names that have been appeared in a present conversation are /NE1/type1/, /NE2/type2/, . . . , /NEn/typen/ (NEn: entity name, typen: entity name type), only an articulation pair corresponding to the following condition are selected for each entity name. For a random entity name NEx, an articulation pair 1) including "[/NEx/$typex/]" in context information,
2) not including "[/NEi/$typex/]" (NEi is an entire available entity name, except for NEx) in context information, or
3) including "[/ANY/typex/]" in context information, are selected.

Because an example articulation pair not corresponding with a present conversation context can be filtered through such a restriction condition, a system can be prevented from responding to a strange subject.

Thereafter, the number of examples that are finally selected at steps 240 and 250 are determined (step 260). If at least one example entirely satisfying a speech act, an LSP, and a restriction condition is found, an articulation pair are selected, and the process continues at step 280. Here, random selection and similarity use of a sentence surface may be applied to a method of selecting an articulation pair. If there is no example selected at the present step, the process continues at step 270.

If there is no example selected at step 260, a search condition is relieved and an example search is again attempted (step 270). Because a user articulation does not always accurately correspond with an articulation in a training corpus, by relieving a restriction condition of an example search, it should be able to search for an example articulation pair most similar to a present user articulation. For this reason, a search condition of each of a speech act and an LSP is relieved. A method of relieving a speech act condition is as follows. It is determined whether a present user articulation is an interrogative sentence or a declarative sentence, and if a present user articulation is an interrogative sentence, a search is again attempted with a speech act of a corresponding category. For example, a speech act corresponding to an interrogative sentence is "yn-q", "wh-q", and "choice-q", and if a speech act that is estimated for a present user articulation is "wh-q", a restriction condition is relieved, and an entire example corresponding to one of "yn-q", "wh-q", and "choice-q" is searched for. A speech act corresponding to a declarative sentence generally has more numbers than those of a speech act that is included in an interrogative sentence, and in this case, an entire category is not searched for. When a person previously tags a speech act in the foregoing training corpus, articulations in which it is difficult to determine a speech act are collected, articulations in which it is difficult to distinguish are determined, and a restriction of a speech act is relieved using the data. For example, when tagging a training corpus, if there are data in which it is difficult to distinguish tagging of "request" and "instruct", when a speech act of a present user articulation is estimated to be a "request", in order to relieve a speech act restriction, a search of an example having "instruct" as a speech act is allowed. That is, for a present user articulation, by allowing a plurality of speech acts, a restriction condition of a speech act is relieved, and by returning to step 240 using the relieved restriction condition, an example articulation pair most similar to a present user articulation may be searched for. A method of relieving an LSP condition is as follows. When an LSP of a present user articulation is "NE1/type1.NE2/type2/ . . . . . NEn/typen", by a method of applying and searching an LSP that is described at step 240, an example including the entirety of each morpheme is searched for in an AND condition. In order to relieve the restriction condition, the least important part of speech among type1, type2, . . . , typen is searched for and a morpheme corresponding thereto is removed from a generated LSP. Importance of a part of speech is determined with reference to a part of speech priority that is defined at training step 140. For example, when an LSP that is generated for a user articulation of "How many seconds does it take to run 100 meters?" is "meter/NNG.how many/MM.second/NNB.run/VV.", and in order to relieve this condition, "MM" of a part of speech (where MM is assumed) having the lowest priority among "NNG", "MM", "NNB", and "VV" is searched for, while "meter/NNG.second/NNB.run/VV" in which a morpheme corresponding thereto is removed becomes a new LSP. After a speech act and an LSP condition are relieved with a method that is described above, the process returns to step 240 and an articulation pair is again searched for. For reference, an entity name restriction is applied without a relieving process at step 250.

If there are one or more found examples at step 260 and an articulation example thereof is selected, by combining a system articulation intention that is represented in the articulation pair and persona information of a presently preset system, an articulation sentence that a final system is to respond with is generated (step 280). In the articulation example, various articulation templates according to a system persona exist. A response of several personas to one user articulation is previously indexed in a training process and is formed in a DB. A response template appropriate to a persona that is set to a present system is selected, and an articulation is generated. As illustrated at training step 120, in the system response template, entity name information is attached within an articulation. With respect to an entity name having a symbol "$" representing that an articulation and an entity name are related, the symbol "$" is output together with an entity name related to an articulation regardless of a present conversation state. For example, if a selected system response template is that "/Hodong Kang/$entertainer/ without /1 Night 2 Days/$program/ is somewhat uninteresting.", a final response articulation becomes "1 Night 2 Days without Hodong Kang is somewhat uninteresting." regardless of a present conversation state. When an entity name within a template is unrelated to an articulation, an entity name within the template is not used as it is, and a final articulation is generated using entity name information that has appeared while performing a conversation up to the present. For example, while performing a conversation up to the present, entity name information of "/basketball/sports/" has appeared and if a present selected system template is "After /baseball/sports/ is ended, what am I going to live for?", a final response articulation becomes "After basketball is ended, what am I going to live for?" having a changed entity name by reflecting a present conversation state. That is, a final response articulation appropriate to a conversation context between a previous user and a system can be generated.

The output unit 400 outputs a final response articulation that is generated at step 280 (step 290).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A conversation management system, comprising:
a training unit that generates an articulation speech act and an entity name of a training corpus, that generates a lexical syntactic pattern which is generated from the training corpus, and that estimates the articulation speech act and the entity name of the training corpus;
a database that stores the articulation speech act, the entity name, and the lexical syntactic pattern of the training corpus;
an input unit receiving a user articulation when an actual conversation is performed by a user;
an execution unit that generates a user articulation speech act and an entity name of the user articulation, that generates a user lexical syntactic pattern, that estimates the user articulation speech act and the entity name of the user articulation, that searches for an articulation pair corresponding to the user articulation at the database using a search condition comprising the estimated user articulation speech act and the generated user lexical syntactic pattern, and that generates a final response by selecting an articulation template using a restriction condition comprising the estimated entity name of the user articulation among the found articulation pair; and
an output unit that outputs the final response that is generated by the execution unit,
wherein the training unit analyzes a part of speech of the training corpus, defines a priority of parts of speech, and generates the lexical syntactic pattern from the part of speech, and
wherein the execution unit estimates the user speech act and the entity name of the user articulation using a machine learning training model generated by the training unit.

2. The conversation management system of claim 1, wherein the training unit displays entity name information in a word of the training corpus, and attaches a symbol when the entity name cannot be replaced.

3. The conversation management system of claim 1, wherein the execution unit comprises a search relieving unit, wherein the search relieving unit enlarges a search range to a plurality of speech acts comprising the estimated user articulation speech act, and searches again for an articulation pair when there is no articulation that is selected by the execution unit.

4. The conversation management system of claim 1, wherein the execution unit comprises a search relieving unit, wherein the search relieving unit enlarges a search range by reducing a range of the user lexical syntactic pattern, and searches again for an articulation pair when no articulation is selected by the execution unit.

5. The conversation management system of claim 1, wherein the execution unit comprises a search relieving unit, wherein the search relieving unit enlarges a search range by reducing a range of the user lexical syntactic pattern and a plurality of speech acts comprising the estimated user articulation speech act, and searches again for an articulation pair when there is no articulation selected by the execution unit.

6. The conversation management system of claim 1, wherein the training unit comprises:
a machine learning model generator that estimates the articulation speech act and the entity name of the training corpus;
an entity name information display unit that displays an information of the articulation speech act and the entity name of the training corpus, and that displays information between the displayed entity name and articulation;
an articulation part of speech analysis unit that analyzes an articulation part of speech; and
a lexical syntactic pattern generator that generates the lexical syntactic pattern from the analyzed part of speech.

7. The conversation management system of claim 1, wherein the execution unit comprises:
a speech act analysis unit that estimates the user articulation speech act;
an entity name recognition unit that recognizes the entity name of the user articulation;
an articulation pair search unit that searches for an articulation pairs corresponding to the user articulation using the user articulation speech act, the user lexical syntactic pattern, and the entity name of the user articulation; and
a restriction condition applying unit that searches for an articulation pair satisfying an entity name restriction among the articulation pairs that are found in the articulation pair search unit.

8. The conversation management system of claim 1, wherein the database indexes and stores the articulation speech act, the entity name, and the lexical syntactic pattern.

9. The conversation management system of claim 1, wherein the training unit comprises a machine learning model generator,
wherein the machine learning model generator estimates the articulation speech act of the training corpus through a classifier that is generated according to a machine learning algorithm.

10. A method of managing a conversation, the method comprising:
a training step of generating an articulation speech act and an entity name of a training corpus, generating a lexical syntactic pattern which is generated from the training corpus, and estimating the articulation speech act and the entity name of the training corpus;
storing the articulation speech act, the entity name of the training corpus, and the lexical syntactic pattern of the training corpus at to a database;
receiving a user articulation when an actual conversation is performed by a user;
an execution step of generating a user articulation speech act and an entity name of the user articulation, generating a user lexical syntactic pattern, estimating the user articulation speech act and the entity name of the user articulation, searching for an articulation pair corresponding to the user articulation at the database using a search condition comprising the estimated user articulation speech act and the generated user lexical syntactic pattern, and selecting an articulation template and generating a final response using a restriction condition comprising the estimated entity name of the user articulation among the found articulation pairs; and outputting the final response that is generated at the execution step, wherein the training step comprises:

analyzing a part of speech of the training corpus;

defining a priority of the parts of speech; and generating the lexical syntactic pattern from the part of speech, and wherein the user articulation speech act and the entity name of the user articulation is estimated by using a machine learning training model generated in the training step.

11. The method of claim 10, wherein the training step comprises:

displaying entity name information in a word of the training corpus;

displaying information between an entity name and an articulation in the training corpus: and training a classifier that estimates the articulation speech act and the entity name of the training corpus.

12. The method of claim 10, wherein the execution step comprises relieving a search, wherein the relieving of a search comprises searching again for, if there is no articulation selected at the execution step, an articulation pair by enlarging a search range to a plurality of speech acts comprising the estimated user articulation speech act.

13. The method of claim 10, wherein the execution step comprises relieving a search, wherein the relieving of a search comprises searching again for, if there is no articulation selected at the execution step, an articulation pair by enlarging a search range by reducing a range of the user lexical syntactic pattern.

14. The method of claim 10, wherein the execution step comprises relieving a search, wherein the relieving of a search comprises searching again for, if there is no articulation selected at the execution step, an articulation pair by enlarging a search range by reducing a range of the user lexical syntactic pattern and a plurality of speech acts comprising the estimated user articulation speech act.

15. The method of claim 10, wherein the training step comprises:

estimating the articulation speech act and the entity name of the training corpus;

displaying an information of the articulation speech act and the entity name of the training corpus and displaying information between the displayed entity name and articulation;

analyzing an articulation part of speech; and generating the lexical syntactic pattern from the analyzed part of speech.

16. The method of claim 10, wherein the execution step comprises:

estimating the user articulation speech act;

recognizing the entity name of the user articulation;

searching for articulation pairs corresponding to the user articulation using the user articulation speech act, the user lexical syntactic pattern, and the entity name of the user articulation; and searching for an articulation pair satisfying an entity name restriction among the found articulation pairs.

17. The method of claim 10, wherein the storing of the articulation speech act comprises indexing and storing the articulation speech act, the entity name, and the lexical syntactic pattern.

18. The method of claim 10, wherein the training step comprises generating the machine learning training model, wherein the generating of the machine learning training model comprises estimating the articulation speech act of the training corpus through a classifier that is generated according to a machine learning algorithm.

* * * * *